United States Patent
Li

(10) Patent No.: US 11,359,930 B2
(45) Date of Patent: Jun. 14, 2022

(54) MAP CONSTRUCTION AND NAVIGATION METHOD, AND DEVICE AND SYSTEM

(71) Applicant: ZTE Corporation, Shenzhen (CN)

(72) Inventor: Congbing Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 66 days.

(21) Appl. No.: 16/958,855

(22) PCT Filed: Dec. 24, 2018

(86) PCT No.: PCT/CN2018/123164
§ 371 (c)(1),
(2) Date: Jun. 29, 2020

(87) PCT Pub. No.: WO2019/128933
PCT Pub. Date: Jul. 4, 2019

(65) Prior Publication Data
US 2020/0340826 A1    Oct. 29, 2020

(30) Foreign Application Priority Data
Dec. 29, 2017   (CN) .......................... 201711499191.0

(51) Int. Cl.
*G01C 21/00*      (2006.01)
*G01C 21/20*      (2006.01)
(Continued)

(52) U.S. Cl.
CPC ....... *G01C 21/3863* (2020.08); *G01C 21/206* (2013.01); *G01C 21/383* (2020.08); *G05D 1/0088* (2013.01); *G05D 1/0214* (2013.01)

(58) Field of Classification Search
CPC ............. G01C 21/3863; G01C 21/383; G01C 21/206; G05D 1/0088; G05D 1/0214
See application file for complete search history.

(56) References Cited

U.S. PATENT DOCUMENTS

2015/0025708 A1   1/2015   Anderson
2017/0225336 A1*  8/2017   Deyle .................. G08B 13/196
(Continued)

FOREIGN PATENT DOCUMENTS

| CN | 103984037 A | 8/2014 |
| CN | 104615138 A | 5/2015 |

(Continued)

OTHER PUBLICATIONS

Shandong University, Dissertation for Doctoral Degree, "Research on Environmental Perception, Recognition and Leader Following Algorithm of the Quadruped Robot", May 21, 2016, pp. 1-181.

(Continued)

*Primary Examiner* — Hunter B Lonsberry
*Assistant Examiner* — Harrison Heflin
(74) *Attorney, Agent, or Firm* — Cantor Colburn LLP

(57) ABSTRACT

Provided are a map building method, a navigation method, a device and a system. A detected obstacle is identified, and a type of the obstacle is determined according to an identification result from multiple obstacle types obtained through classification according to an obstacle characteristic; a map is built and the obstacle is marked, and the type of the obstacle is recorded. A newly added obstacle detected on a path is identified during navigation, and obstacle avoidance process is performed according to the type of the newly added obstacle.

19 Claims, 9 Drawing Sheets

(51) Int. Cl.
  *G05D 1/00* (2006.01)
  *G05D 1/02* (2020.01)

(56) References Cited

U.S. PATENT DOCUMENTS

| | | | |
|---|---|---|---|
| 2017/0248963 | A1 | 8/2017 | Levinson |
| 2017/0307746 | A1* | 10/2017 | Rohani ............... G01S 13/42 |
| 2018/0239355 | A1* | 8/2018 | Lee ..................... G08G 1/161 |
| 2018/0299274 | A1* | 10/2018 | Moghe ................ H04W 4/44 |
| 2018/0317725 | A1* | 11/2018 | Lee ..................... A47L 11/202 |
| 2019/0019330 | A1* | 1/2019 | Miyaoka ............. G01C 21/32 |
| 2019/0143967 | A1* | 5/2019 | Kutila ................. G05D 1/0257 |
| | | | 701/23 |
| 2019/0187703 | A1* | 6/2019 | Millard ............... G05D 1/0246 |
| 2020/0151611 | A1* | 5/2020 | McGavran .......... H04W 4/44 |

FOREIGN PATENT DOCUMENTS

| | | |
|---|---|---|
| CN | 104808671 A | 7/2015 |
| CN | 105074602 A | 11/2015 |
| CN | 105182979 A | 12/2015 |
| CN | 106338996 A | 1/2017 |
| CN | 106530946 A | 3/2017 |
| CN | 107256019 A | 10/2017 |
| CN | 108344414 A | 7/2018 |
| JP | 5891553 B2 | 3/2016 |
| WO | 2019089017 A1 | 5/2019 |

OTHER PUBLICATIONS

International Search Report for corresponding application PCT/CN2018/123164 filed Dec. 24, 2018; dated Mar. 25, 2019.
Chinese Office Action for corresponding application 201711499191.0; dated Dec. 18, 2020.
Chinese Office Report for corresponding application 201711499191.0; dated May 17, 2021.
Chinese Search Report for corresponding application 201711499191.0; dated Dec. 18, 2020.
European Search Report for corresponding application EP 18893502; Report dated Sep. 1, 2021.
European Search Report for corresponding application EP18893502; Report dated Jan. 5, 2022.
Garratt Gallagher, "Gatmo: A Generalized Approach to Tracking Movable Objects", 2009 IEE International Conference on Robotics and Automation, Kobe International Conference Center, Japan May 12-17, 2009.

* cited by examiner

Negotiation type obstacle (2, 1)

Risk type obstacle (10, 9)

MAP CONSTRUCTION AND NAVIGATION METHOD, AND DEVICE AND SYSTEM

This is a U.S. National Stage Application, filed under 35 U.S.C. 371, of International Patent Application No. PCT/CN2018/123164, filed on Dec. 24, 2018, which claims priority to Chinese patent application No. 201711499191.0 filed on Dec. 29, 2017 to the CNIPA, the contents of which said applications are incorporated herein by reference in their entireties.

TECHNICAL FIELD

The present application relates to, but is not limited to, the field of data processing, for example, relates to a map building method, a navigation method, a device and a system.

BACKGROUND

According to a traditional raster map building method, a complete two-dimensional grid is used for abstractly representing the entire indoor environment information. The rasters on the raster map are classified into three types, namely obstacle raster, non-obstacle raster and unknown raster. The obstacle raster represents that an obstacle exists at a position corresponding to the obstacle raster, the non-obstacle raster represents that a position corresponding to the non-obstacle raster is free to pass, and the unknown raster represents that information at a position corresponding to the unknown raster is unknown.

According to the traditional raster map building method, all environment information is tightly coupled on the same raster map, and a navigation map at the current time is only used at the current time, so that the reusability is poor. In addition, according to the raster map, the influence of the raster where the obstacle is located on passage condition of the nearby rasters is not considered. Since a mobile robot itself occupies certain space, the robot cannot pass through the nearby rasters of the obstacle without limit. Otherwise, the robot is likely to collide with the obstacle while passing through the nearby rasters of the obstacle.

In view of the above situation, an improvement solution in the related art is that hierarchical management and updating mechanism of the raster map are introduced, and the raster map is divided into a static map layer, an obstacle map layer, a sonar obstacle map layer, an expansion map layer and so on from bottom to top. The static map layer manages that the mobile robot moves in a room without interference of a dynamic obstacle. The static map layer is a raster representation of the overall environment built according to information detected by a sensor. The obstacle map layer is a raster representation of a dynamic obstacle detected by a laser sensor during the mobile robot performing a navigation task. The sonar obstacle map layer is a raster representation of a dynamic obstacle detected by a sonar sensor during the mobile robot performing the navigation task. The expansion map layer does not use data of an external sensor, and perform expansion process on peripheral non-obstacle rasters of the obstacle rasters with a predetermined expansion radius as a scale through using the respective obstacle rasters in the static map layer, the obstacle map layer, and the sonar map layer as fulcrums. The non-obstacle rasters in the expansion radius form an expansion map layer. For the non-obstacle rasters on the expansion map layer, the robot may pass when ensuring that a central point of the robot does not coincide with these non-obstacle rasters.

However, this map building method still has shortcomings in performance, such as in at least one of availability, flexibility, safety or resource utilization.

SUMMARY

The following is a summary of the subject described herein in detail. This summary is not intended to limit the protection scope of the claims.

An embodiment of the present application provides a map building method. The map building method includes following steps: identifying a detected obstacle, and determining a type of the obstacle according to an identification result from multiple obstacle types obtained through classification according to an obstacle characteristic; building a map and marking the obstacle, and recording the type of the obstacle.

An embodiment of the present application further provides a map building system. The map building system includes an obstacle identification unit, an obstacle classification unit and an obstacle processing unit. The obstacle identification unit is configured to identify a detected obstacle to obtain an identification result. The obstacle classification unit is configured to determine a type of the obstacle according to the identification result from multiple obstacle types obtained through classification according to an obstacle characteristic. The obstacle processing unit is configured to build a map and mark the obstacle, and record the type of the obstacle.

An embodiment of the present application further provides a map building device. The map building device includes a memory, a processor and computer programs stored in the memory and executable on the processor. When executing the computer programs, the processor implements the map building method described in the embodiment of the present application.

An embodiment of the present application further provides a computer storage medium. Computer programs are stored in the computer storage medium. The computer programs, after read by a processor, execute the map building method described in the embodiment of the present application.

An embodiment of the present application further provides a navigation method. The navigation method includes following steps: identifying a newly added obstacle detected on a path, and determining a type of the newly added obstacle according to an identification result from multiple obstacle types obtained through classification according to an obstacle characteristic; performing an obstacle avoidance process according to the type of the newly added obstacle.

An embodiment of the present application further provides a navigation system. The navigation system includes a navigation module and a map building module. The navigation module is configured to plan a path, and notify the map building module of starting a navigation map update task. The map building module is configured to identify a newly added obstacle detected on the path, and determine a type of the newly added obstacle according to an identification result from multiple obstacle types obtained through classification according to an obstacle characteristic. The navigation module is further configured to receive the updated navigation map, and perform obstacle avoidance process according to the type of the newly added obstacle.

An embodiment of the present application further provides a navigation device. The navigation device includes a memory, a processor and computer programs stored in the memory and executable on the processor. When executing the computer programs, the processor implements the navigation method described in the embodiment of the present application.

An embodiment of the present application further provides a computer storage medium. Computer programs are stored in the computer storage medium. The computer programs, after read by a processor, execute the navigation method described in the embodiment of the present application.

Other aspects can be understood after the drawings and the detailed description are read and understood.

BRIEF DESCRIPTION OF DRAWINGS

FIG. 8 is a schematic diagram of an exemplary negotiation type obstacle map layer according to the embodiment 3 of the present application;

FIG. 9 is a schematic diagram of an exemplary risk type obstacle map layer according to the embodiment 3 of the present application;

DETAILED DESCRIPTION

Figure 1:
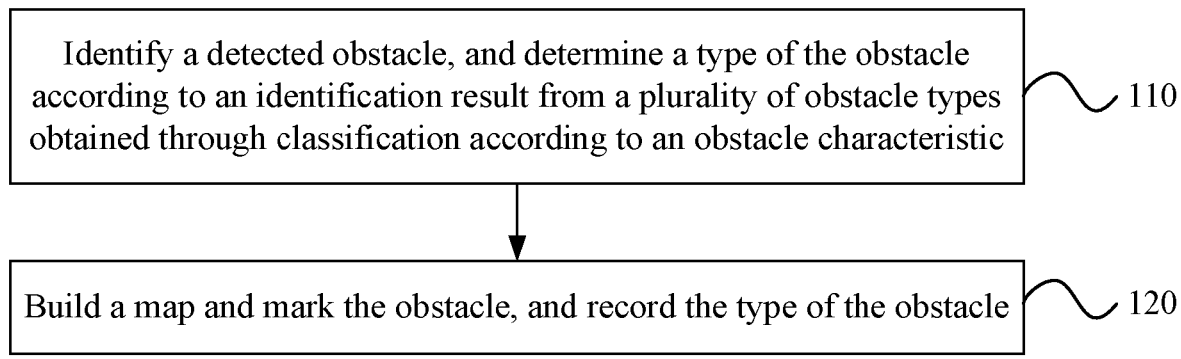
FIG. 1 is a flowchart of a map building method according to an embodiment 1 of the present application.

Hereinafter, embodiments of the present application will be described below in detail with reference to the drawings. It should be noted that the embodiments of the present application and features of the embodiments may be arbitrarily combined with each other in case of no conflict.

In processes on obstacles according to a map building method in the related art, the obstacles are roughly classified according to detection results of a sensor such as a laser sensor or a sonar sensor, but rather than classified according to characteristics of identified obstacles themselves. Thus, semantics are weak, and it is hard to implement flexible map building and obstacle avoidance strategy according to the characteristics of the obstacles.

Weak semantics may result in situations described below.

1) Since there is no obvious distinction between the obstacles, the same marking strategy is used in an application. This strategy often lack universality and may even introduce unnecessary waste of computing and storage resources. For example, a newly added refrigerator and a household pet are found in front of a sensor, and if the household pet is maintained according to the same finding and marking strategy (for example, tracking and maintaining are started within 3 meters) as the refrigerator, the maintenance of the household pet may bring frequent updates on an obstacle map layer. The movement of the household pet is agility and changeable, and the household pet itself has certain avoidance capability. Therefore, a map layer of the maintenance of such obstacle may be totally limited within a smaller range, and a safety hazard is not generated meanwhile the resources are effectively saved. In reverse, if the newly added refrigerator is maintained according to a smaller range, it is not conducive to the selection of a global route of navigation of the mobile robot.

2) All obstacles are processed using the same expansion radius, which is not unreasonable in a practical scenario. In fact, peripheral non-obstacle rasters of the newly added refrigerator in environment space may be totally processed according to a relatively small expansion radius, so that the maximum passing efficiency of the robot is ensured. However, for an infant who suddenly appears in the environment space, the peripheral non-obstacle rasters of the infant need to be processed according to a relatively large expansion radius to ensure the safety of the infant.

3) At the end of one navigation task, all information about the obstacle layer is discarded. A consideration of this design is that the newly added obstacle appearing in the environment during the navigation does not necessarily appear and keep the position unchanged during the next navigation. However, in fact, if newly added obstacles are distinguished, the position of the obstacles, at least such as newly added furniture, does not change constantly once fixed. Such obstacles may be updated to a static map layer in real-time after the navigation task at the current time is completed. Thus, the real-time updating of the static map layer is ensured, and the calculation amount and the storage space of the identification and marking of unnecessary obstacles are saved for subsequent navigation task.

4) That all obstacles are treated equally during the obstacle avoidance may directly cause the loss of the flexibility of the mobile robot in the obstacle avoidance. In fact, if the mobile robot identifies that an adult in front blocks the road, a voice interaction mode may be adopted to change passive obstacle avoidance into active obstacle avoidance.

Therefore, embodiments of the present application provide new map building and navigation solutions.

Embodiment 1

An embodiment relates to a map building method and a map building system.

The map building method in the embodiment is implemented by the map building system. In a mobile robot navigation application, the map building system may be implanted into a navigation chip used by a mobile robot, and may be integrated with a visual sensor used by the mobile robot, or may be implemented by a single chip; the above is similar in other applications.

A map in the embodiment is an indoor raster map as an example, but the present application is not limited to this, and the manner of classifying obstacles may be extended to an outdoor map, a non-raster map and the like.

The map building method in the embodiment is shown in FIG. 1, and includes step 110 and step 120.

In the step 110, a detected obstacle is identified, and a type of the obstacle is determined according to an identification result from multiple obstacle types obtained through classification according to an obstacle characteristic.

Different from the related art, the above obstacle characteristic refers to the characteristic of the obstacle itself, and before the type of the obstacle is determined, the obstacle needs to be identified first, for example, the obstacle is identified as a person, an animal, a television, a cabinet and the like. This is different from the direct classification according to the detection result in the related art. For example, in the related art, it is detected whether the current obstacle moves within a period of time, and the obstacle is classified into a dynamic state or a static state according to a detection result. Such classification does not reflect the characteristic of the obstacle itself, nor can it determine whether the obstacle has an autonomous movement capability.

In the embodiment, the obstacle characteristic includes at least one of autonomous movement capability, interaction capability, safety or autonomous avoidance capability of the obstacle. The autonomous movement capability of the obstacle indicates that the obstacle itself can move without an external force applied to move the obstacle. For example, human, animal, a toy car and a mobile robot have the autonomous movement capability, but furniture such as a table, a chair and a sofa, and electric appliances such as a television do not have the autonomous movement capability. The interaction capability of the obstacle refers to human-machine interaction capability, and includes, but is not limited to, voice interaction and gesture interaction. An adult or a mobile robot supporting interaction may fall into this category. The mobile robot may also be considered as a special "human". The safety of the obstacle refers to whether the obstacle is a protected object, such as an infant. A user may also designate other items as the protected object. The autonomous avoidance capability of the obstacle refers to whether autonomous avoidance of the obstacle can be implemented under a stress condition, for example, when the mobile robot gets close to the obstacle. When a specific object is classified, the above capabilities of the object may overlap. For example, an obstacle with the autonomous avoidance capability usually also has the autonomous movement capability, and so does the adult with human-machine interaction capability.

In the embodiment, the multiple obstacle types obtained through classification according to the obstacle characteristic include at least two of a stabilization type, a negotiation type, a risk type or a violent-change type. A stabilization type obstacle includes at least one obstacle without the autonomous movement capability. A negotiation type obstacle includes at least one obstacle with the autonomous movement capability and the human-machine interaction capability. A risk type obstacle includes at least one obstacle acted as the protected object. A violent-change type obstacle includes at least one obstacle with the autonomous avoidance capability.

The stabilization type obstacle includes, but is not limited to, objects without the autonomous movement capability, such as wall, door, window, baby carriage, sofa, table, chair, cabinet and television, and the positions of these objects are relatively stable. Once these obstacles are marked on a raster map, the information on the raster map may be reused for a relatively long period of time.

The negotiation type obstacle includes humans with the autonomous movement capability and voice interaction capability other than infants. The humans themselves have good behavior capability and good interaction capability, may actively adjust own behaviors according to external information, may provide more choices for autonomous navigation of the mobile robot, and enhance the flexibility of the mobile robot.

The risk type obstacle includes the protected objects such as infants, who are a crowd with weak autonomous behavior capability, weak voice interaction capability and weak risk recognition capability. Such crowd are the objects that should be prevented and protected most during the autonomous navigation of the mobile robot. Safety of such crowd is more important than the efficiency of the autonomous navigation of the mobile robot.

The violent-change type obstacle includes, but is not limited to, a household pet with strong movement capability such as a cat and a dog, and electronic equipment with strong movement capability such as a robot. They all have the autonomous avoidance capability, and have good maneuverability and high randomness of movement.

The current image identification can identify more than 1000 kinds of articles, and most common obstacles in home environment can be identified. Unidentified obstacles may be classified as the stabilization type obstacles for processing, or may be classified as a separate type.

In another embodiment, the multiple obstacle types obtained through classification according to the obstacle characteristic include at least two of the stabilization type, the negotiation type, the risk type or the violent-change type. The stabilization type obstacle includes at least one of a building component or furniture. The negotiation type obstacle includes an adult. The risk type obstacle includes an infant. The violent-change type obstacle includes a household pet.

In the another embodiment, the multiple obstacle types are also obtained through classification according to the obstacle characteristic, but it is not strictly required that articles being of a certain type have exactly at least one same characteristic. In addition, not all obstacles in the environment need to be classified, only some important obstacles such as a building component, furniture, an adult, an infant and a household pet need to be classified. If at least two of an adult, an infant, a building component or a household pet are processed according to different strategies, the classification and recording are performed during building the map, that is, the method in the another embodiment is adopted.

In addition, the term "adult" refers to a healthy person with the autonomous movement capability and the human-machine interaction. Special adults who have disabled lower limbs or are deaf-mute may be classified separately, especially when the family members are relatively fixed. Certainly, the adults may not be classified in detail as above, and the special adults may also be classified as the negotiation type obstacles and a new route may be planned when no response is obtained during obstacle avoidance.

In addition, it should be noted that names of the above types of the obstacles may be changed. For example, the above four types may also be called as a first type, a second type, a third type and a fourth type, or other names capable of being distinguished as different types, and such name variations do not constitute any difference in the technical solution.

In the embodiment, the process of identifying the detected obstacle, and determining the type of the obstacle according to the identification result from the multiple obstacle types obtained through classification according to the obstacle characteristic includes: performing obstacle detection on image information acquired by a visual sensor; performing image identification on an image of the detected obstacle; and searching information of preset obstacles respectively included in the multiple obstacle types according to the identified obstacle, to determine the type of the obstacle. For example, when a cat appears in an image acquired by the visual sensor, an image of the cat is extracted through the obstacle detection, and the cat is known to be a cat through the image identification. Among the preset obstacles included in the multiple obstacle types, the cat belongs to the violent-change type obstacle, so the type of the obstacle may be determined to be the violent-change type. The above classification may be implemented through a classifier.

In the present application, the type of the obstacle may be recorded either directly or indirectly. For example, the detected type is directly recorded as type identification in attribute information of the obstacle; or the obstacle is only marked on a layer corresponding to the type of the obstacle, and the type of the obstacle may be determined according to the layer where the obstacle is located. Thus, the present application does not limit the manner of recording, as long as the recorded information may be used for determining the type of obstacle later.

In the step 120, a map is built and the obstacle is marked, and the type of the obstacle is recorded.

The map in the embodiment is a raster map. The process in which the map is built and the obstacle is marked includes: building different map layers for obstacles which are of different types, and marking each of the obstacles on a map layer corresponding to a type of the each of the obstacles according to the type of the each of the obstacles.

In the embodiment, the above built map is a navigation map, and the identification, classification and marking of the obstacle are the identification, classification and marking of a newly added obstacle detected during the navigation in addition to an obstacle already existing on the environment map. However, the present application is not limited to this. The map built according to the method in the embodiment may be also used for services other than the navigation. For example, the built map is a real-time dynamic scenario map used for services such as real environment game and scout. In this case, obstacles are not distinguished into original obstacle and newly added obstacle.

The navigation map in the embodiment is a navigation map including a static map layer. The static map layer is marked with an obstacle already existing in the environment before navigation is performed. The static map layer may be generated according to an introduced environment map. An obstacle marked on the static map layer is the stabilization type obstacle. During the navigation, the newly added obstacle detected in the environment is identified, a dynamic map layer is built and the newly added obstacle is marked, and the type of the newly added obstacle is recorded. After that, expansion process may be performed on a periphery of the obstacle, and the static map layer and the dynamic map layer are merged to obtain an updated navigation main map.

In an example, the navigation map may include map layers described below:

the static map layer is configured to maintain the overall layout of the entire indoor environment before the mobile robot performs the navigation, and the obstacle on the static map layer is the stabilization type obstacle; and the dynamic map layer includes a stabilization type obstacle map layer, a violent-change type obstacle map layer, a negotiation type obstacle map layer and a risk type obstacle map layer.

The stabilization type obstacle map layer is configured to maintain a newly added stabilization type obstacle detected by the visual sensor during the navigation of the mobile robot and not included on the static map layer.

The violent-change type obstacle map layer is configured to maintain the violent-change type obstacle detected by the visual sensor during the navigation of the mobile robot.

The negotiation type obstacle map layer is configured to maintain the negotiation type obstacle detected by the visual sensor during the navigation of the mobile robot.

The risk type obstacle map layer is configured to maintain the risk type obstacle detected by the visual sensor during the navigation of the mobile robot.

Thus, respective map layers are independent from each other and have respective clear semantics. In order to use the map, it is only necessary to merge the data of the respective map layers in an order.

After the type of the obstacle is recorded, the embodiment adopts at least one of strategies described below according to the type of the obstacle.

Marking Strategy

When the multiple obstacle types include the violent-change type (where the violent-change type obstacle includes a household pet), the process in which the map is built and the obstacle is marked includes: if the type of the obstacle is the violent-change type, building the violent-change type obstacle map layer and marking the obstacle. A maintenance area of the violent-change type obstacle map layer is smaller than a maintenance area of a map layer other than the violent-change type obstacle map layer. The map layer other than the violent-change type obstacle map layer is configured to mark an obstacle which is of a type other than the violent-change type in the multiple obstacle types. If the maintenance area is small, the built map is small. The map layer other than the violent-change type obstacle map layer may be at least one of the stabilization type obstacle map layer, the risk type obstacle map layer or the negotiation type obstacle map layer. However, in other embodiments, the map layer other than the violent-change type obstacle map layer may be a map layer used for marking an obstacle being of other type.

Different marking strategies are adopted for different obstacles, which can effectively avoid frequent updating of an obstacle map caused by frequent change of the position of the violent-change type obstacle and save the resource consumption of the system.

Expansion Strategy

When the multiple obstacle types include the risk type (where the risk type obstacle includes an infant), after the map is built and the obstacle is marked, and the type of the obstacle is recorded, the method further includes: performing an expansion process on a periphery of the obstacle. If the type of the obstacle is the risk type, a first expansion radius is utilized to perform the expansion process. The first expansion radius is greater than an expansion radius utilized to perform the expansion process on a periphery of an obstacle which is of a type other than the risk type in the multiple obstacle types.

When the map is layered, the expansion process may be performed on the periphery of the obstacle on a current map layer according to a corresponding expansion radius before respective map layers are merged, and after the expansion process, the respective map layers are merged. Alternatively, the expansion process may be performed after the merging, which is not limited in the present application. In addition, the expansion strategy may be adopted on a map which is not layered.

When a new risk type obstacle is found during the navigation, it is checked whether a condition for sufficient expansion is met at the periphery of the risk type obstacle raster, that is, the expansion process of a predetermined range is performed in eight directions of the risk type obstacle, namely front, back, left, right, upper left, upper right, lower left and lower right, through taking the risk type obstacle raster as a center and taking a radical expansion radius as the scale. When other obstacle exists within a range of the radical expansion radius of the risk type obstacle or reaches the boundary of the main map, a phenomenon of insufficient expansion occurs. When the condition for sufficient expansion is met at periphery rasters of the risk type obstacle raster, it is further checked whether an obstacle avoidance condition is met beyond the expansion radius, that is, whether an obstacle-free raster that the robot can pass exists on a path between a current position and a target position. When the obstacle avoidance condition is met beyond the expansion radius, the mobile robot avoids the obstacle through a raster beyond the expansion radius and proceeds to the target point. When the condition for sufficient expansion is not met at the periphery rasters of the risk type obstacle, or the obstacle avoidance condition is not met beyond the expansion radius, it is indicated that the path is impassable or free space around the obstacle is not enough to ensure the requirement of safe navigation, and a new path needs to be planned to reach the target point.

Different expansion strategies are adopted for different obstacles, so that the safety of the navigation path of the mobile robot is effectively improved, and the safety of the protected object such as an infant is ensured.

Reuse Strategy

When the multiple obstacle types include the stabilization type (where the stabilization type obstacle includes at least one of a building component or furniture), after the navigation is completed, the method further includes: adding the newly added stabilization type obstacle which is marked on the dynamic map layer onto the static map layer.

In an example, if the newly added obstacle is the stabilization type obstacle, the stabilization type obstacle map layer is built and the newly added obstacle is marked. If the newly added obstacle is an obstacle being of other type, other dynamic map layer is built and the newly added obstacle is marked. In this example, after one navigation is completed, the newly added obstacle marked on the stabilization type obstacle map layer may be directly added onto the static map layer. However, in other examples, the stabilization type obstacle may be selected according to type information in the obstacle attribute and added onto the static map layer, and it is unnecessary to build an individual dynamic map layer for the newly added obstacle.

For the current navigation and a subsequent navigation, the position of the stabilization type obstacle in the environment may be changed, and if such change is not reflected on the static map, the accuracy of modeling of the environment map is affected. Thus, the subsequent autonomous navigation may be affected. The static map layer is updated and perfected according to the detected stabilization type obstacle, so that repeated processing of the stabilization type obstacle in a next navigation task is avoided, and the efficiency is improved. If the obstacle marked on the static map layer is in the current navigation, the static map layer may also be updated to delete the corresponding obstacle.

Meanwhile, due to classification of different obstacles, more extension strategies and remedial measures are provided for obstacle avoidance (for example, when a negotiation type obstacle is encountered during the proceeding and the remaining free space is insufficient, a human-machine conversation mode may be tried to change passive obstacle avoidance into active obstacle avoidance). This will be described in detail in the next embodiment.

The embodiment further provides a map building system for implementing the above method. The map building system is implanted into the navigation chip used by the mobile robot, and may be integrated with the visual sensor used by the mobile robot, or may be implemented by a single chip. The chip or the visual sensor is connected to a robot control system.

Figure 2:
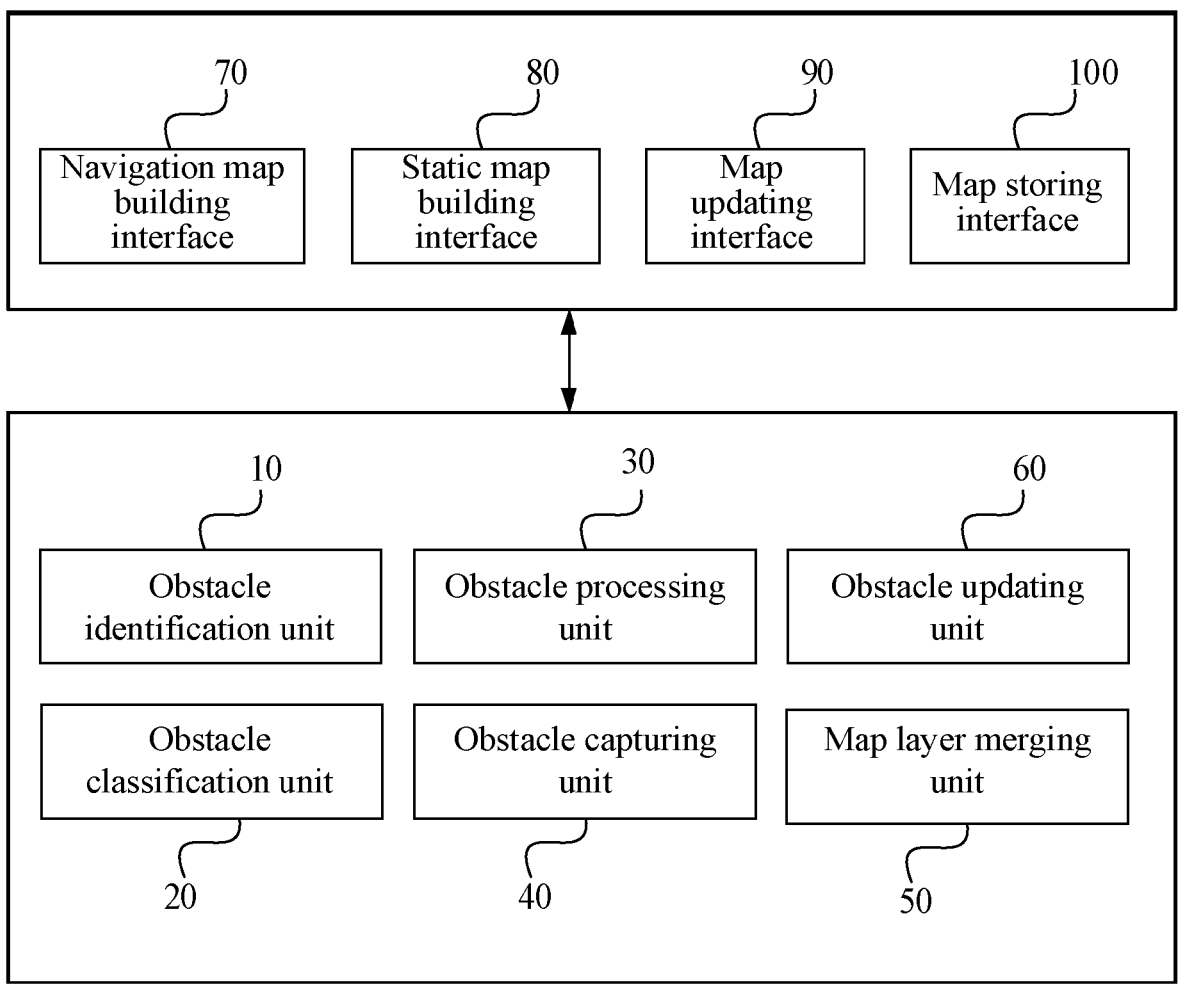
FIG. 2 is a module diagram of a map building system according to the embodiment 1 of the present application.

As shown in FIG. 2, the map building system in the embodiment includes an obstacle identification unit 10, an obstacle classification unit 20, an obstacle processing unit 30, an obstacle capturing unit 40, a map layer merging unit 50, an obstacle updating unit 60, a navigation map building interface 70, a static map building interface 80, a map updating interface 90 and a map storing interface 100.

The obstacle identification unit 10 is configured to identify the detected obstacle to obtain the identification result.

The obstacle classification unit 20 is configured to determine the type of the obstacle according to the identification result from multiple obstacle types obtained through classification according to the obstacle characteristic.

The obstacle processing unit 30 is configured to build the map and mark the obstacle, and record the type of the obstacle.

In the embodiment, the obstacle characteristic includes at least one of autonomous movement capability, interaction capability, safety or autonomous avoidance capability of the obstacle.

In the embodiment, the multiple obstacle types obtained through classification according to the obstacle characteristic include at least two of the stabilization type, the negotiation type, the risk type or the violent-change type. The stabilization type obstacle includes at least one of a building component or furniture. The negotiation type obstacle includes an adult. The risk type obstacle includes an infant. The violent-change type obstacle includes a household pet.

In the embodiment, the built map is the raster map. The obstacle processing unit is configured to build the map and mark the obstacle through following operations: building different map layers for obstacles which are of different types, and marking each of the obstacles on the map layer corresponding to the type of the each of the obstacles according to the type of the each of the obstacles.

At this time, the obstacle processing unit may specifically includes following sub-units: a violent-change type obstacle map layer processing unit, a risk type obstacle map layer processing unit, a negotiation type obstacle map layer processing unit and a stabilization type obstacle map layer processing unit. The violent-change type obstacle map layer processing unit is configured to process the violent-change type obstacle and build the violent-change type obstacle map layer. The risk type obstacle map layer processing unit is configured to process the risk type obstacle and build the risk type obstacle map layer. The negotiation type obstacle map layer processing unit is configured to process the negotiation type obstacle and build the negotiation type obstacle map layer. The stabilization type obstacle map layer processing unit is configured to process the stabilization type obstacle and build the stabilization type obstacle map layer. An obstacle not belonging to the violent-change type, the risk type and the negotiation type may also be processed by the stabilization obstacle map layer processing unit.

When the above different map layer processing units build the corresponding map layers, there are some different processes. For example, a filtering distance used by the violent-change type obstacle map layer processing unit when filtering obstacles is the smallest, and the filtering distance is equivalent to the size of the maintenance area of the map layer. In addition, the respective map layer processing units may add different type values to obstacles on the respective layers.

In the embodiment, the system further includes the obstacle capturing unit 40. The obstacle capturing unit 40 is configured to perform obstacle detection according to the image information acquired by the visual sensor, that is, the obstacle capture unit 40 is configured to find the obstacle. The obstacle identification unit is configured to identify the detected obstacle through a following operation: performing image identification on an image of the obstacle detected by the obstacle capturing unit. The obstacle classification unit is configured to determine the type of the obstacle from the multiple obstacle types obtained through classification according to the obstacle characteristic through a following operation: searching information of preset obstacles respectively included in the multiple obstacle types according to the obstacle identified by the obstacle identification unit, to determine the type of the obstacle.

The obstacle capturing unit is optional. The process of performing the obstacle detection according to the image information acquired by the visual sensor may be completed by the visual sensor or a subsequent function unit.

In the embodiment, when the multiple obstacle type include the violent-change type (where the violent-change obstacle includes a household pet), the operation in which the obstacle processing unit builds the map and marks the obstacle includes: if the type of the obstacle is the violent-change type, building the violent-change type obstacle map layer and marking the obstacle. A maintenance area of the violent-change type obstacle map layer is smaller than a maintenance area of other map layer. The other map layer is configured to mark an obstacle which is of a type other than the violent-change type in the multiple obstacle types.

In the embodiment, the map is the navigation map including the static map layer. The static map layer is marked with an obstacle already existing in the environment before the navigation is performed. The obstacle identification unit is configured to identify the detected obstacle through a following operation: identifying a newly added obstacle detected in the environment during the navigation. The operation in which the obstacle processing unit builds the map and marks the obstacle includes: building a dynamic map layer and marking the newly added obstacle.

The system further includes the map layer merging unit 50. The map layer merging unit 50 is configured to perform an expansion process on a periphery of an obstacle, and merge the static map layer and the dynamic map layer to obtain the updated navigation main map. Here, the static map layer and the dynamic map layer are merged, that is, an obstacle marked in the static map layer and an obstacle marked in the dynamic map layer are marked in the same map according to positions of the obstacles, and a mapping relation among the obstacles, expansion rasters and map coordinates on the map is maintained. Other related information such as an expansion range and the type of the obstacle is also stored in the associated data of the map.

For the present application, the merging of the map layers is optional. On a map not layered, the above expansion strategy, reuse strategy and avoidance strategy may still be used through obstacle characteristic classification.

In another embodiment, the expansion process on the obstacle is performed by a single function unit. In the embodiment, the multiple obstacle types include the risk type, and the risk type obstacle includes an infant. The system further includes an obstacle expansion unit. The obstacle expansion unit is configured to perform the expansion process on a periphery of an obstacle marked on the map, and when the type of the obstacle is the risk type, a first expansion radius is utilized to perform the expansion process. The first expansion radius is greater than an expansion radius utilized to perform the expansion process on a periphery of an obstacle which is of a type other than the risk type in the multiple obstacle types.

In the embodiment, the map is the navigation map including the static map layer. The multiple obstacle types include the stabilization type. The stabilization type obstacle includes at least one of a building component or furniture.

The system further includes the obstacle updating unit 60. The obstacle updating unit 60 is configured to add the newly added stabilization type obstacle marked on the dynamic map layer onto the static map layer after the navigation is completed.

In the embodiment, the above function units of the map building system are encapsulated into interfaces, so that the above function units become a service platform capable of providing a map service for a service such as the mobile robot service. In other embodiments, the above function units and the interfaces may be respectively implemented through discrete devices.

Interfaces of the map building system in the embodiment include a navigation map building interface 70. The navigation map building interface 70 is configured to receive an external request for updating a navigation map, start the obstacle identification unit, the obstacle classification unit, the obstacle processing unit and the map layer merging unit to execute a navigation map updating task, and return an updated navigation main map to the mobile robot service.

In an embodiment, the interfaces of the map building system may further include a static map building interface 80. The static map building interface 80 is configured to receive an external request for building a static map, complete the building of an indoor environment static map and return the static map to the requester. However, the static map layer may alternatively be implemented through introducing an environment map, and not necessarily be built by the map building system.

A map updating interface 90 is configured to receive an external request for updating a map, and add a newly added stabilization type obstacle marked on a dynamic map layer onto the static map layer after one navigation is completed.

A map storing interface 100 is configured to store the built or updated static map.

If the environment map is store on a memory card inside the map building system, the static map may be updated and stored by itself.

The embodiment further provides a map building device. The map building device includes a memory, a processor and computer programs stored in the memory and executable on the processor. When executing the computer programs, the processor implements the method in the embodiment.

According to the map building solution in the embodiment of the present application, the representation of the map is more semantic and refined, so that better practicability, flexibility and safety may be provided for the autonomous navigation of the mobile robot, and the resources may be saved. The map building solution in the embodiments of the present application is very suitable for an application scenario of indoor mobile robot navigation.

Embodiment 2

Figure 3:
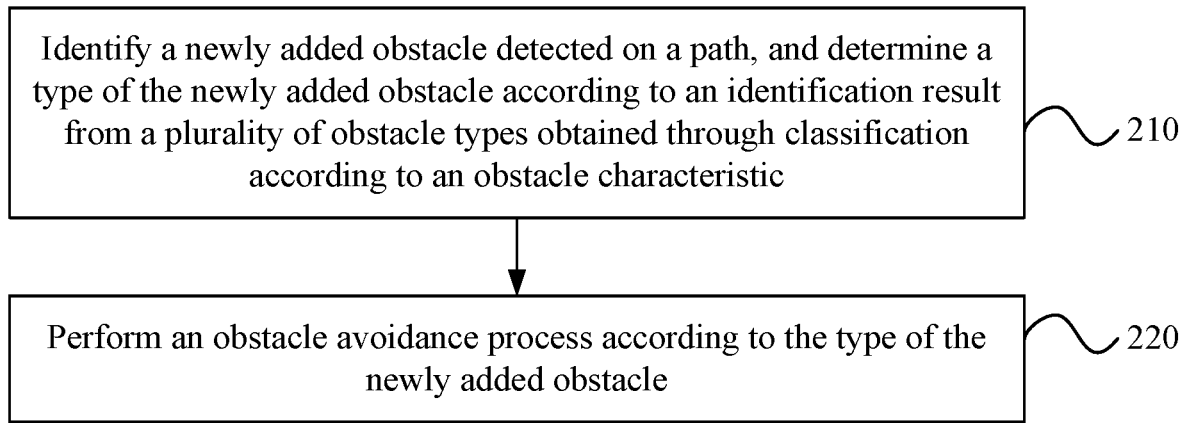
FIG. 3 is a flowchart of a navigation method according to an embodiment 2 of the present application.

An embodiment provides a navigation method. As shown in FIG. 3, the navigation method includes step 210 and step 220.

In the step 210, a newly added obstacle detected on a path is identified, and a type of the newly added obstacle is determined according to an identification result from multiple obstacle types obtained through classification according to an obstacle characteristic. In the step 220, an obstacle avoidance process is performed according to the type of the newly added obstacle.

In the embodiment, the multiple obstacle types obtained through classification according to the obstacle characteristic include a negotiation type and other types. A negotiation type obstacle includes an adult. The other types may be a stabilization type, a violent-change type and the like. In the embodiment, the other types are not limited. In the embodiment, the process in which the obstacle avoidance process is performed according to the type of the newly added obstacle includes: if the newly added obstacle is the negotiation type obstacle, interacting with the negotiation type obstacle to request avoidance of the negotiation type obstacle.

In an example, after interacting with the negotiation type obstacle to request the avoidance of the negotiation type obstacle, the method further includes: determining whether the negotiation type obstacle executes, in a preset duration, at least one operation of leaving the path or returning a response of agreeing to avoid; proceeding along the path based on a determination result that the negotiation type obstacle executes the at least one operation of (i) leaving the path or (ii) returning the response of agreeing to avoid; planning a new path based on a determination result that the negotiation type obstacle does not execute the at least one operation of leaving the path or returning the response of agreeing to avoid.

In the embodiment, a navigation map used for navigation is an indoor raster map used by a mobile robot during the navigation. The navigation map may be built according to the map building method in the embodiment 1, but this is not necessary, as long as the negotiation type obstacle may be distinguished from an obstacle being of other type in the built map.

Figure 4:
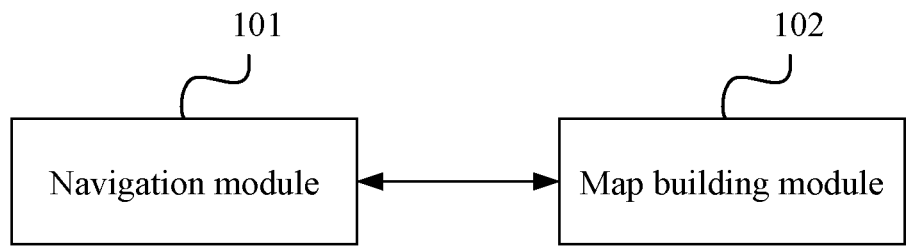
FIG. 4 is a module diagram of a navigation system according to the embodiment 2 of the present application.

The embodiment further provides a navigation system. As shown in FIG. 4, the navigation system includes a navigation module 101 and a map building module 102.

The navigation module 101 is configured to plan a path, and notify the map building module of starting a navigation map updating task.

The map building module 102 is configured to identify a newly added obstacle detected on the path, determine a type of the newly added obstacle according to an identification result from multiple obstacle types obtained through classification according to an obstacle characteristic, update the navigation map to mark the newly added obstacle and record the type of the newly added obstacle, and return the updated navigation map to the navigation module.

The navigation module 101 is further configured to receive the updated navigation map, and perform an obstacle avoidance process according to the type of the newly added obstacle.

The above navigation module may be implemented by, for example, a navigation system controlling the proceeding of the mobile robot, and the map building system may use, but is not limited to, the map building system described in the embodiment 1.

In the embodiment, the multiple obstacle types include a negotiation type. A negotiation type obstacle includes an adult.

The system further includes a human-machine interaction module. For example, the human-machine interaction module may be a voice system.

The navigation module is configured to perform the obstacle avoidance process according to the type of the newly added obstacle through a following operation: if the newly added obstacle is the negotiation type obstacle, interacting with the negotiation type obstacle through the human-machine interaction module to request avoidance of the negotiation type obstacle.

In the embodiment, after the navigation module interacts with the negotiation type obstacle through the human-machine interaction module to request the avoidance of the negotiation type obstacle, the navigation module is further configured to determine whether the negotiation type obstacle executes, in the preset duration, at least one operation of leaving the path or returning a response of agreeing to avoid; keep the path unchanged based on a determination result that the negotiation type obstacle executes the at least one operation of leaving the path or returning the response of agreeing to avoid; plan a new path based on a determination result that the negotiation type obstacle does not execute the at least one operation of leaving the path or returning the response of agreeing to avoid.

According to the solution of the above embodiment, the type of the newly added obstacle classified according to the obstacle characteristic is determined during the navigation, and different obstacle avoidance strategies are adopted for obstacles being of different types, so that the obstacle avoidance effect is improved.

Embodiment 3

The embodiment describes, through an example, a raster map building procedure based on indoor obstacle characteristic classification. Before the start of a navigation task, a mobile robot moves around an indoor environment, and complete the building of a static map layer according to information of an external sensor. Since this stage occurs before the mobile robot navigation task, all obstacles in the static map layer are stabilization type obstacles.

Figure 5:
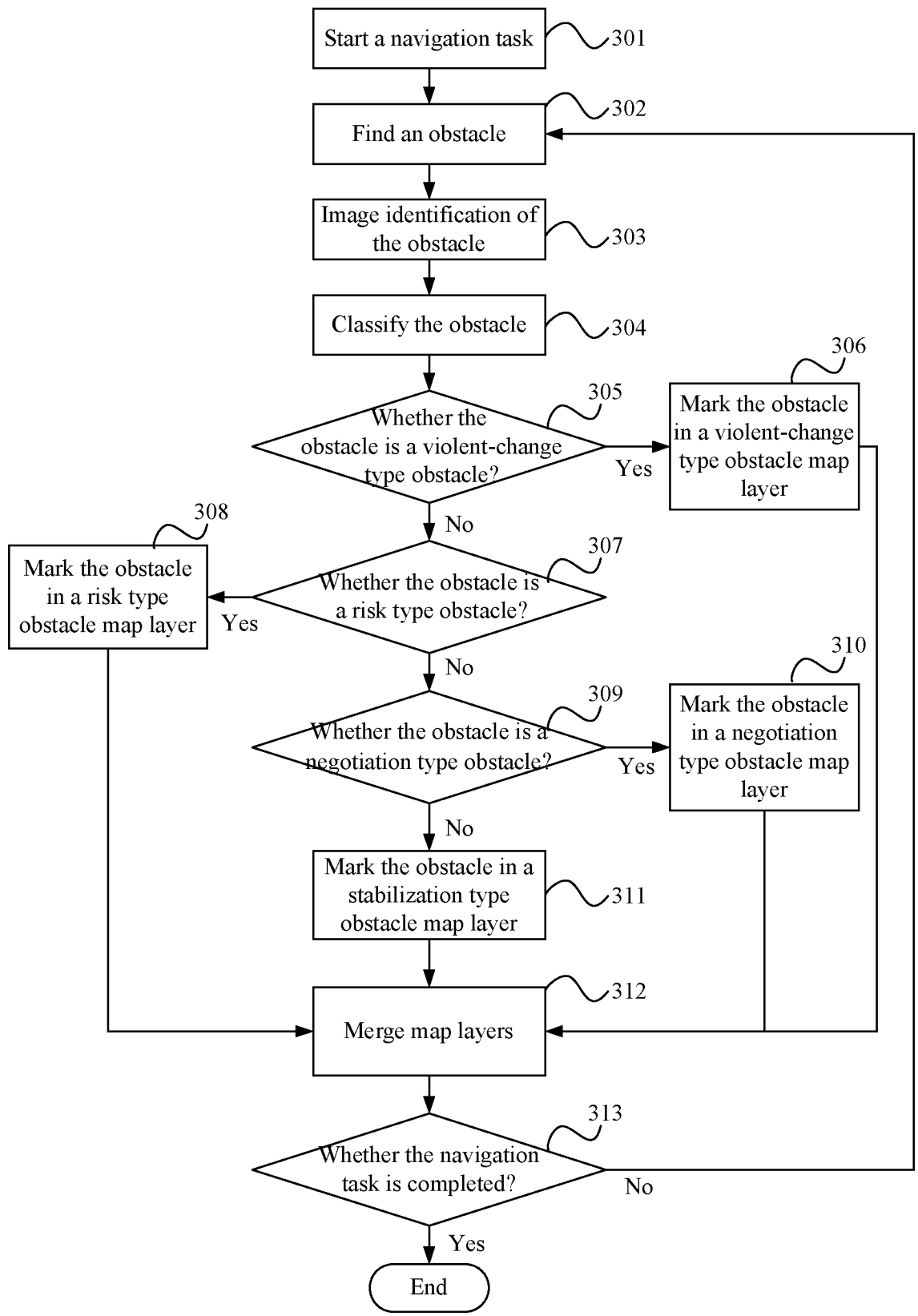
FIG. 5 is a flowchart of a raster map building method based on indoor obstacle characteristic classification according to an embodiment 3 of the present application.

As shown in FIG. 5, the procedure includes step 301 to step 313.

In the step 301, a navigation task is started.

In the step 302, an obstacle is found.

In this step, a map building system detects an image acquired by a sensor and finds that a new obstacle appears in front.

In the step 303, an image of the obstacle is identified.

In this step, the map building system performs feature extraction and feature identification according to image information of the obstacle, for example, the map building system identifies that the obstacle in front is a cat or a table.

In the step 304, the obstacle is classified.

In this step, based on an identification result, the map building system classifies the obstacle according to the type of the obstacle.

In the step 305, it is determined whether the obstacle is a violent-change type obstacle. If the obstacle is the violent-change type obstacle, the procedure proceeds to the step 306; if the obstacle is not the violent-change type obstacle, the procedure proceeds to the step 307.

In the step 306, the obstacle is marked on a violent-change type obstacle map layer, and the procedure proceeds to the step 312.

In this example, a maintenance area of the violent-change type obstacle map layer is smaller than maintenance areas of other map layers.

In the step 307, it is determined whether the obstacle is a risk type obstacle. The procedure proceeds to the step 308 based on a determination result that the obstacle is the risk type obstacle, or the procedure proceeds to the step 309 based on a determination result that the obstacle is not the risk type obstacle.

In the step 308, the obstacle is marked on a risk type obstacle map layer, and the procedure proceeds to the step 312.

In the step 309, it is determined whether the obstacle is a negotiation type obstacle. The procedure proceeds to the step 310 based on a determination result that the obstacle is the negotiation type obstacle, or the procedure proceeds to the step 311 based on a determination result that the obstacle is not the negotiation type obstacle.

In the step 310, the obstacle is marked on a negotiation type obstacle map layer, and the procedure proceeds to the step 312.

In the step 311, the obstacle is marked on a stabilization type obstacle map layer.

In the step 312, all the above dynamic map layers and the static map layer are merged to obtain a main raster map used for navigation.

Before the merging or after the merging, expansion process may be performed on peripheries of the obstacles. An expansion radius used for the obstacle in the risk type obstacle map layer is greater than expansion radiuses used for obstacles in other map layers.

In the step 313, it is determined whether the navigation task is ended. The procedure is ended based on a determination result that the navigation task is completed, or the procedure proceeds to the step 302 based on a determination result that the navigation task is not ended.

A simple example of building map layers classified based on the obstacle characteristic is shown in FIG. 6 to FIG. 11.

Figure 6:
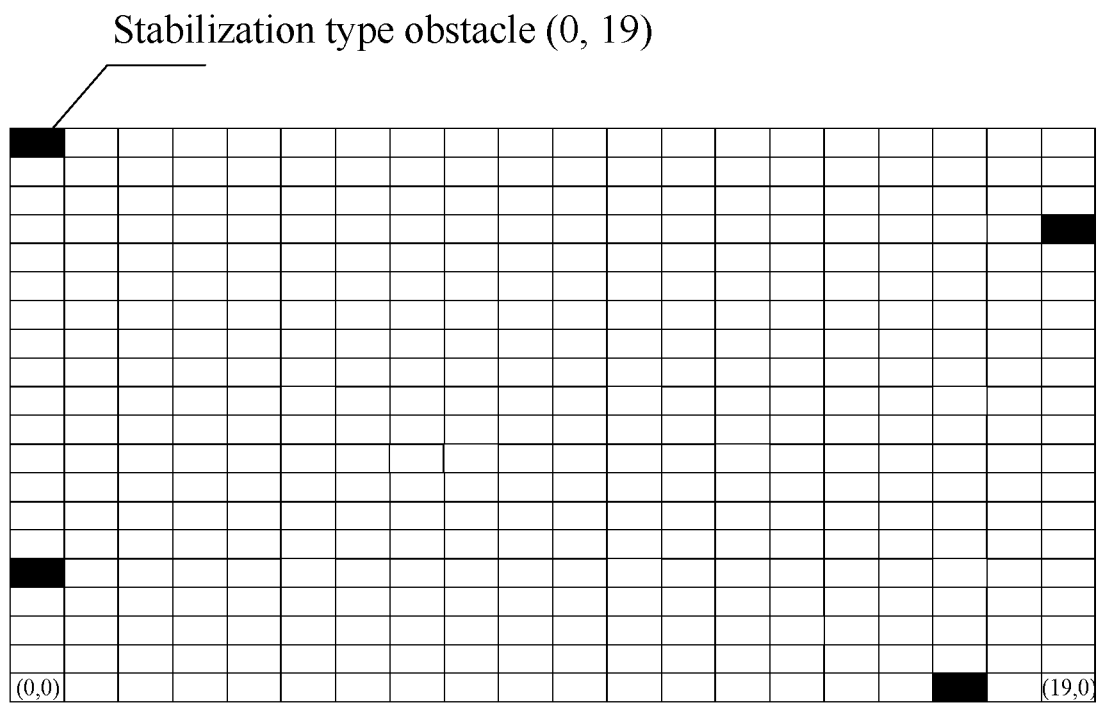
FIG. 6 is a schematic diagram of an exemplary static map layer according to the embodiment 3 of the present application.

FIG. 6 shows an example of the static map layer. The general distribution of the entire indoor environment is stored in rasters of this map layer. For ease of understanding, the indoor environment is simplified, and if a raster range maintained by the map layer is from (0, 0) to (19, 19), only four stabilization type obstacles are included, and these obstacles are respectively located on coordinates (17, 0), (0, 4), (0, 19) and (19, 16).

Figure 7:
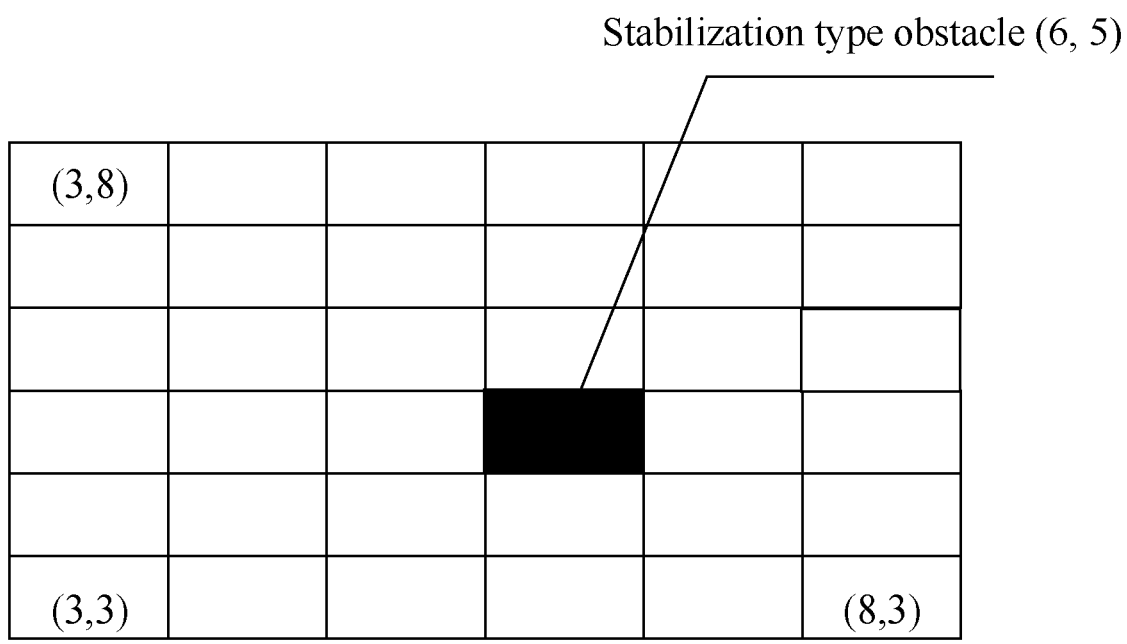
FIG. 7 is a schematic diagram of an exemplary stabilization type obstacle map layer according to the embodiment 3 of the present application.

FIG. 7 shows an example of the stabilization type obstacle map layer. The stabilization type obstacle found during the navigation of the mobile robot is stored in the rasters of this map layer. It does not need to pay attention to the entire indoor environment space all the time, but only maintains the obstacle changes in a certain area in front of the sensor. For ease of understanding, it is assumed here that an area range where this map layer is responsible for maintaining is rasters with the size of 6×6, raster coordinates corresponding to the current maintenance area are from (3, 3) to (8, 8), and a stabilization type obstacle located at coordinates (6, 5) is newly found.

FIG. 8 shows an example of the negotiation type obstacle map layer. The negotiation type obstacle found during the navigation of the mobile robot is stored in the rasters of this map layer. It does not need to pay attention to the entire indoor environment space all the time, but only maintains the obstacle changes in a certain area in front of the sensor. For ease of understanding, it is assumed here that an area range where this map layer is responsible for maintaining is rasters with the size of 6×6, raster coordinates corresponding to the current maintenance area are from (0, 0) to (5, 5), and a negotiation type obstacle located at coordinates (2, 1) is newly found.

FIG. 9 shows an example of the risk type obstacle map layer. The risk type obstacle found during the navigation of the mobile robot is stored in the raster of this map layer. It does not need to pay attention to the entire indoor environment space all the time, but only maintains the obstacle changes in a certain area in front of the sensor. For ease of understanding, it is assumed here that an area range where this map layer is responsible for maintaining is a raster with the size of 6×6, raster coordinates corresponding to the current maintenance area are from (7, 7) to (12, 12), and a risk type obstacle located at a coordinate point (10, 9) is newly found.

Figure 10:
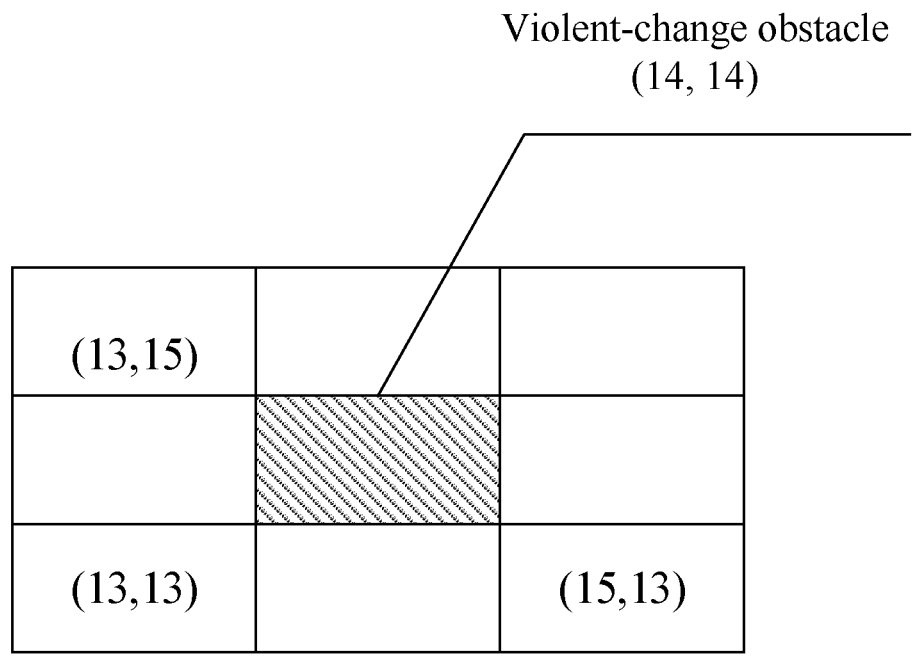
FIG. 10 is a schematic diagram of an exemplary violent-change type obstacle map layer according to the embodiment 3 of the present application.

FIG. 10 shows an example of the violent-change type obstacle map layer. The violent-change type obstacle found during the navigation of the mobile robot is stored in the raster of this map layer. It does not need to pay attention to the entire indoor environment space all the time, but only maintains the obstacle changes in a certain area in front of the sensor. For ease of understanding, it is assumed here that an area range where this map layer is responsible for maintaining is rasters with the size of 3×3, raster coordinates corresponding to the current maintenance area are from (13, 13) to (15, 15), and a violent-change type obstacle located at coordinates (14, 14) is newly found.

Figure 11:
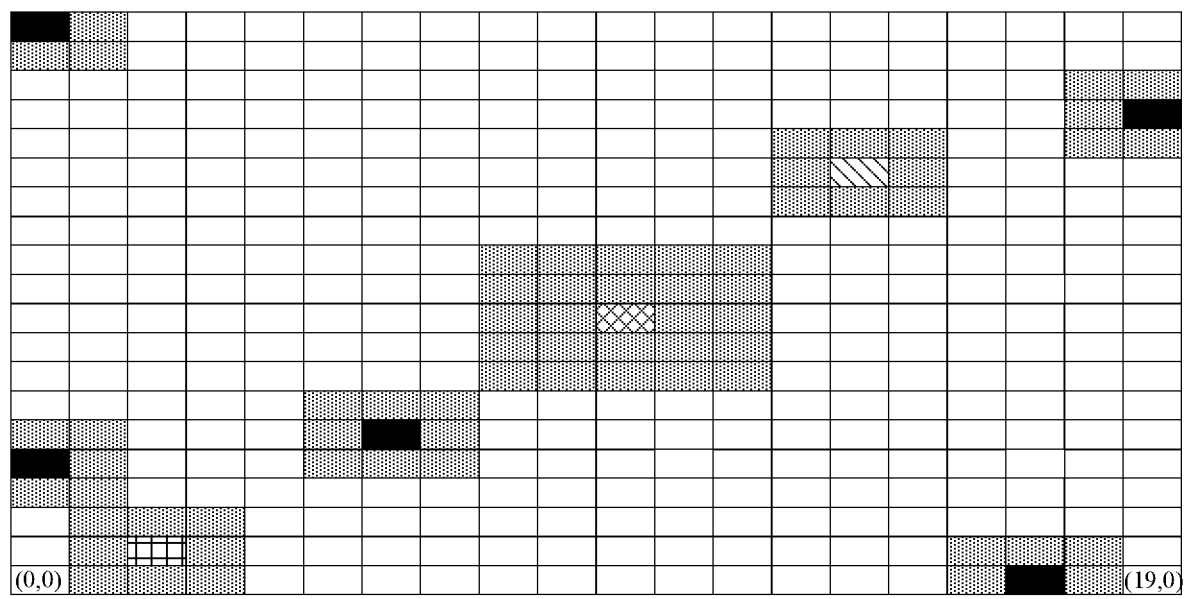
FIG. 11 is a schematic diagram of an exemplary merged main raster map according to the embodiment 3 of the present application.

FIG. 11 shows an example of the main raster map obtained after merging by the map layer merging unit. This map layer extracts obstacles in each of the map layers, and arranges them on corresponding coordinates of the main raster map. The expansion process is performed on peripheries of respective obstacles according to different expansion processing strategies. Specifically, the expansion process is performed on the periphery of the risk type obstacle using a radical expansion radius, and the expansion process is performed on the periphery of other obstacle using a conservative expansion radius. For simplicity, it is assumed that the radical expansion radius is 2 raster lengths and the conservative expansion radius is 1 raster length.

Figure 12:
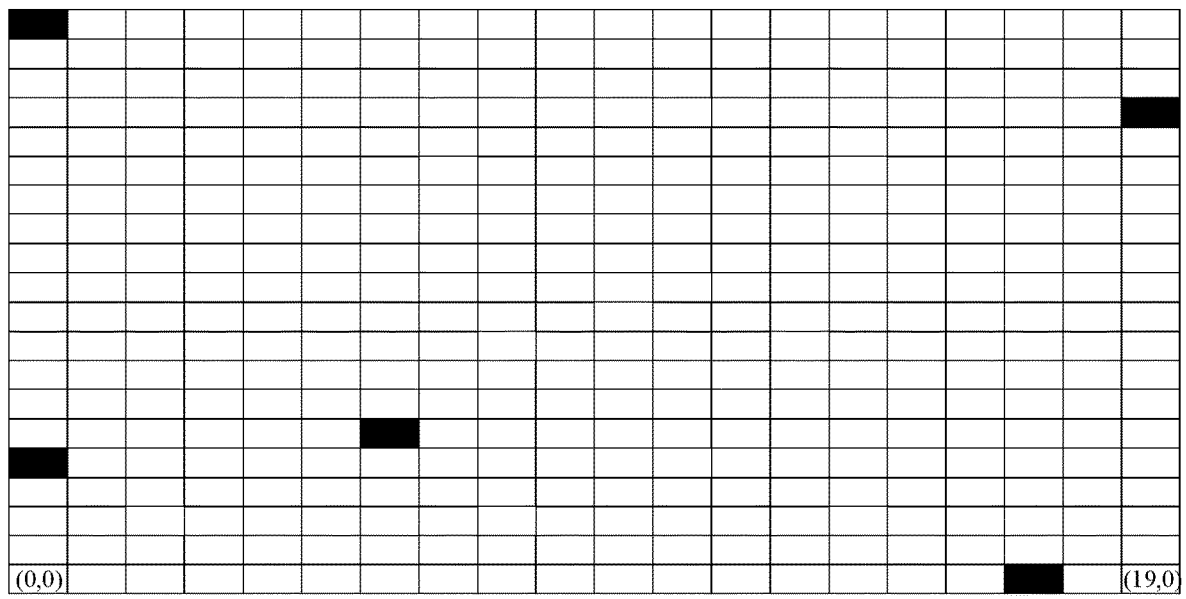
FIG. 12 is a schematic diagram of an exemplary updated static map layer according to the embodiment 3 of the present application.

In an embodiment, after the current navigation task is completed, the map building system may update obstacle data of the stabilization type obstacle map layer to the static map layer. The updated static map layer is shown in FIG. 12.

Embodiment 4

Figure 13:
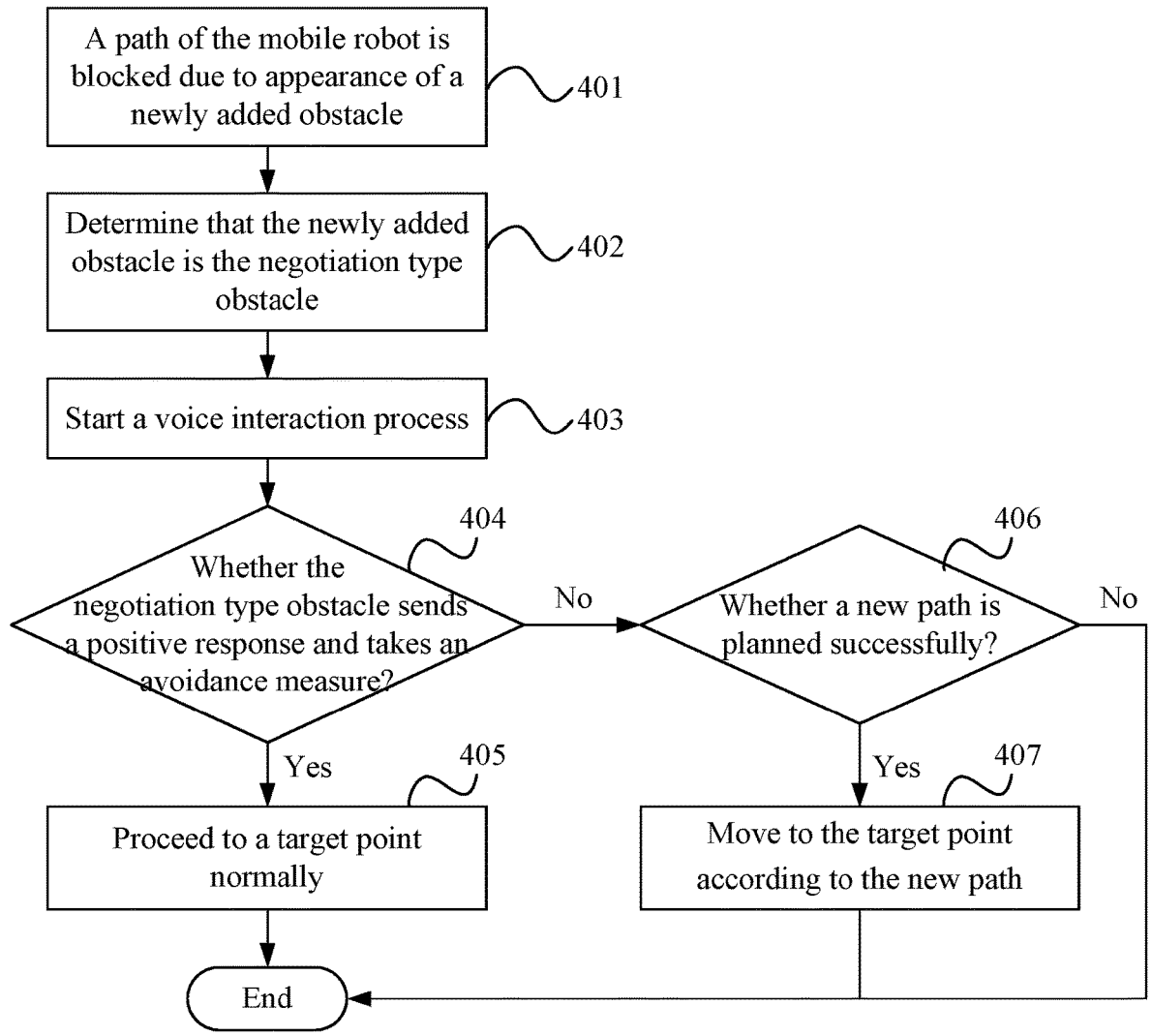
FIG. 13 is a flowchart of a negotiation avoidance procedure during navigation according to an embodiment 4 of the present application.

This embodiment describes an example of an obstacle avoidance strategy of a negotiation type obstacle. As shown in FIG. 13, a negotiation avoidance procedure in this embodiment includes step 401 to step 407.

In the step 401, during navigation of a mobile robot, an originally planned path is blocked due to appearance of a new obstacle in front.

In the step 402, a navigation system extracts type identification of the obstacle in a main raster map, determines that the obstacle is the negotiation type obstacle, and notifies a voice interaction service module of the mobile robot.

In the step 403, the voice interaction service module starts a voice interaction process, requests avoidance of the negotiation type obstacle in front, and waits for a response.

In the step 404, it is determined whether the negotiation type obstacle sends, in a preset duration, a positive voice response and takes an avoidance measure, and leaves the path. The step 405 is executed based on a determination result that the negotiation type obstacle sends the positive voice response and takes the avoidance measure, and leaves the path. The procedure proceeds to the step 406 based on a determination result that the negotiation type obstacle does not send the positive voice response, does not take the avoidance measure, and does not leave the path.

The step 405 may be executed when at least one condition of obtaining the positive voice response from the negotiation type obstacle or determining that the avoidance of the negotiation type obstacle has been performed is met.

In the step 405, the navigation system does not change the path, indicates the robot to normally follow the path to the target, and the procedure is ended.

In the step 406, the navigation system plans a new path by taking a current position of the mobile robot as a start point and taking the target point as an end point. If the new path is planned successfully, the step 407 is executed; if the new path is not planned successfully, it is indicated that no path capable of reaching the target point exists, the navigation task may be forcibly ended.

In the step 407, the navigation system indicates the mobile robot to reach the target point according to the new path, and the procedure is ended.

Embodiment 5

The raster map building system in this embodiment is packaged with various interfaces, and may provide a map service to the outside, which is called a raster map service platform in the embodiment. The embodiment describes a process of calling the raster map service platform by a mobile robot service, and a third-party mobile robot service may be another application scenario established on the basis of autonomous navigation of an indoor robot. The autonomous navigation is a basic function, and doing what after navigating to a target point may create value is a problem solved by the third-party mobile robot service.

Figure 14:
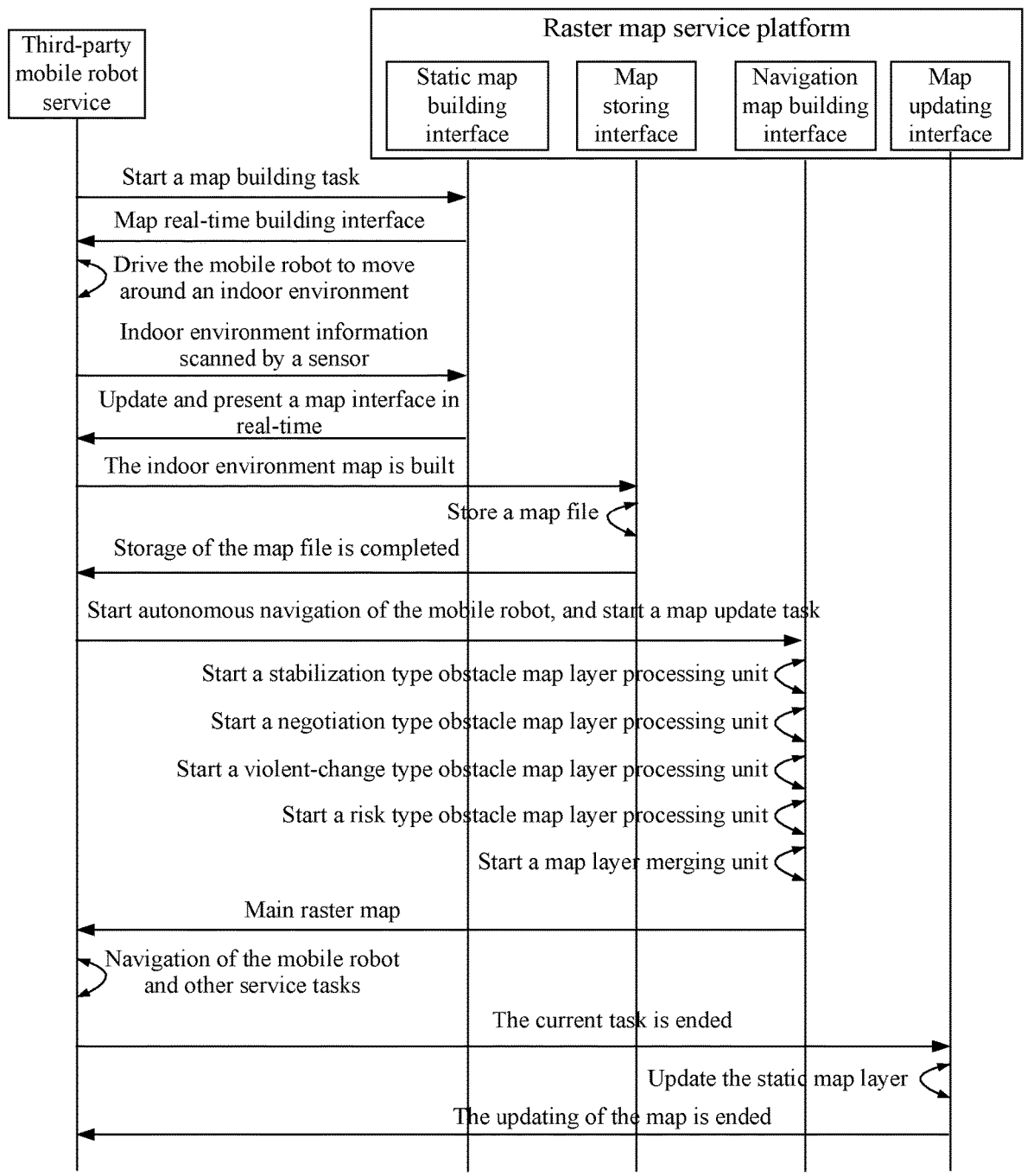
FIG. 14 is a diagram of a process calling, by a mobile robot service, a raster map service provided by a map building system according to an embodiment 5 of the present application.

As shown in FIG. 14, the procedure includes steps described below.

In a step 1, the third-party mobile robot service calls a static map building interface provided by the raster map service platform, and starts a map building task.

In a step 2, the raster map service platform starts a map real-time building process and returns a map real-time building interface to the third-party mobile robot service.

In a step 3, the third-party mobile robot service drives the mobile robot moves around an indoor environment.

In a step 4, the third-party mobile robot service sends indoor environment information scanned by a sensor to the static map building interface of the raster map service platform.

In a step 5, the raster map service platform updates the map and sends the updated map to the third-party mobile robot service through the static map building interface, and a map interface is updated and presented in real-time.

In a step 6, the step 3 to step 5 are repeated until the indoor environment map is built, and the third-party mobile robot service calls a map storing interface of the raster map service platform to store the built map.

In a step 7, a storage process is started through the map storing interface, and the built map data is stored as a map file in an external memory.

In a step 8, after the map is stored, a completed state is returned to the third-party mobile robot service through the map storing interface.

In a step 9, the third-party mobile robot executes the autonomous navigation, the above stored map file is loaded into the navigation system, and the map updating task is started through calling the navigation map building interface provided by the raster map service platform.

In a step 10, the navigation map building interface executes the process, a stabilization type obstacle map layer processing unit, a negotiation type obstacle map layer processing unit, a violent-change type obstacle map layer processing unit, a risk type obstacle map layer processing unit and a map layer merging unit are respectively started and configured to build the map layers corresponding to obstacles being of various types during the navigation of the mobile robot, and generate a main map.

In a step 11, the obtained main raster map used for real-time navigation is returned to the third-party mobile robot service through the navigation map building interface.

In a step 12, the third-party mobile robot service uses the main raster map used for the real-time navigation for executing the navigation and other service tasks.

In a step 13, the third-party mobile robot service completes the navigation task at the current time and calls the map updating interface of the raster map service platform to update the static layer map.

In a step 14, the process is executed by the map updating interface, and the static map layer is updated through using information of the stabilization type obstacle map layer.

In a step 15, after the map is updated, the map updating interface exports the updated map, substitutes the original map file, returns the updated state to the third-party mobile robot service, and the entire procedure is ended.

It may be understood by those skilled in the art that function modules/units in all or part of the steps of the method, the system and the apparatus disclosed above may be implemented as software, firmware, hardware and appropriate combinations thereof. In the hardware implementation, the division of the function modules/units mentioned in the above description may not correspond to the division of physical components. For example, one physical component may have several functions, or one function or step may be implemented jointly by several physical components. Some or all components may be implemented as software executed by processors such as central processing units, digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random-access memory (RAM), a Read-Only Memory (ROM), an Electrically Erasable Programmable Read-Only Memory (EE- PROM), a flash memory, or other memory technologies, a Compact Disc Read-Only Memory (CD-ROM), a Digital Video Disc (DVD) or other optical disc storage, a magnetic cassette, a magnetic tape, disk storage or other magnetic storage apparatuses, or any other medium used to store the desired information and accessible by a computer. In addition, as is known to those skilled in the art, the communication medium generally includes computer-readable instructions, data structures, program modules or other data in modulated data signals such as carriers or other transmission mechanisms, and may include any information delivery medium.

What is claimed is:

1. A map building method, comprising:
   identifying a detected obstacle, and determining a type of the obstacle according to an identification result from a plurality of obstacle types obtained through classification according to an obstacle characteristic;
   building a map and marking the obstacle, and recording the type of the obstacle; and
   controlling a mobile robot according to the map;
   wherein the plurality of obstacle types comprise a stabilization type, a negotiation type, a risk type and a violent-change type; and
   wherein a maintenance area of a violent-change type obstacle map layer is smaller than a maintenance area of a risk type obstacle map layer, a maintenance area of a negotiation type obstacle map layer and a maintenance area of a stabilization type obstacle map layer.

2. The map building method of claim 1, wherein the obstacle characteristic comprises at least one of autonomous movement capability, interaction capability, safety or autonomous avoidance capability of the obstacle.

3. The map building method of claim 2, wherein
   an obstacle of the stabilization type comprises at least one obstacle without the autonomous movement capability;
   an obstacle of the negotiation type comprises at least one obstacle with the autonomous movement capability and human-machine interaction capability;
   an obstacle of the risk type comprises at least one obstacle acted as a protected object; and
   an obstacle of the violent-change type comprises at least one obstacle with the autonomous avoidance capability.

4. The map building method of claim 1, wherein
   an obstacle of the stabilization type comprises at least one of a building component or furniture;
   an obstacle of the negotiation type comprises an adult;
   an obstacle of the risk type comprises an infant; and
   an obstacle of the violent-change type comprises a household pet.

5. The map building method of claim 1, wherein the map is an indoor raster map; and
   the process of building the map and marking the obstacle comprises: building different map layers for obstacles which are of different types, and marking each of the obstacles on a map layer corresponding to a type of the each of the obstacles according to the type of the each of the obstacles.

6. The map building method of claim 1, wherein the process of identifying the detected obstacle, and determining the type of the obstacle according to the identification result from the plurality of obstacle types obtained through classification according to the obstacle characteristic comprises:
   performing obstacle detection on image information acquired by a visual sensor, performing image identification on an image of the detected obstacle, and searching information of preset obstacles respectively comprised in the plurality of obstacle types according to the identified obstacle, to determine the type of the obstacle.

7. The map building method of claim 1, wherein an obstacle of the violent-change type comprises a household pet; and
   the process of building the map and marking the obstacle comprises: in a case where the type of the obstacle is the violent-change type, building the violent-change type obstacle map layer and marking the obstacle in the violent-change type obstacle map layer.

8. The map building method of claim 1, wherein an obstacle of the risk type comprises an infant; and
   after the process of building the map and marking the obstacle, and recording the type of the obstacle, the map building method further comprises: performing an expansion process on a periphery of the obstacle, wherein in a case where the type of the obstacle is the risk type, a first expansion radius is utilized to perform the expansion process, wherein the first expansion radius is greater than an expansion radius utilized to perform the expansion process on a periphery of an obstacle which is of a type other than the risk type in the plurality of obstacle types.

9. The map building method of claim 1, wherein
   the map is a navigation map comprising a static map layer, wherein the static map layer is marked with an obstacle existing in an environment before navigation is performed;
   the process of identifying the detected obstacle comprises: identifying a newly added obstacle detected in the environment during the navigation;
   the process of building the map and marking the obstacle, and recording the type of the obstacle comprises: building a dynamic map layer and marking the newly added obstacle, and recording a type of the newly added obstacle; and
   after the process of building the dynamic map layer and marking the newly added obstacle, the map building method further comprises: performing an expansion process on a periphery of the obstacle and merging the static map layer and the dynamic map layer to obtain an updated navigation main map.

10. The map building method of claim 9, wherein an obstacle of the stabilization type comprises at least one of a building component or furniture; and
    after the navigation is completed, the map building method further comprises: adding a newly added obstacle of the stabilization type marked on the dynamic map layer onto the static map layer.

11. The map building method of claim 10, wherein
    the process of building the dynamic map layer and marking the newly added obstacle comprises: in a case where the newly added obstacle is the obstacle of the stabilization type, building the stabilization type obstacle map layer and marking the newly added obstacle; in a case where the newly added obstacle is an obstacle being of a type other than the stabilization type, building a dynamic map layer other than the stabilization type obstacle map layer and marking the newly added obstacle; and
    the process of adding the newly added obstacle of the stabilization type onto the static map layer comprises: adding the newly added obstacle marked on the stabilization type obstacle map layer onto the static map layer.

12. A map building device, comprising a memory, a processor, and computer programs stored in the memory and executable on the processor, wherein, when executing the computer programs, the processor implements the map building method according to claim 1.

13. A non-transitory computer readable storage medium, wherein computer executable instructions are stored in the non-transitory computer readable storage medium, the computer executable instructions are configured to execute the map building method of claim 1.

14. A navigation method, comprising:
identifying a newly added obstacle detected on a path, and determining a type of the newly added obstacle according to an identification result from a plurality of obstacle types obtained through classification according to an obstacle characteristic;
performing an obstacle avoidance process according to the type of the newly added obstacle; and
controlling a mobile robot according to the obstacle avoidance process;
wherein the plurality of obstacle types comprise a stabilization type, a negotiation type, a risk type and a violent-change type; and
wherein a maintenance area of a violent-change type obstacle map layer is smaller than a maintenance area of a risk type obstacle map layer, a maintenance area of a negotiation type obstacle map layer and a maintenance area of a stabilization type obstacle map layer.

15. The navigation method of claim 14, wherein
an obstacle of the negotiation type comprises an adult; and
the performing the obstacle avoidance process according to the type of the newly added obstacle comprises: in a case where the newly added obstacle is the obstacle of the negotiation type, interacting with the obstacle of the negotiation type to request avoidance of the obstacle of the negotiation type.

16. The navigation method of claim 15, wherein after the process of interacting with the obstacle of the negotiation type to request the avoidance of the obstacle of the negotiation type, the navigation method further comprises:
determining whether the obstacle of the negotiation type executes, in a preset duration, at least one operation of:
leaving the path or returning a response of agreeing to avoid;
proceeding along the path based on a determination result that the obstacle of the negotiation type executes the at least one operation of leaving the path or returning the response of agreeing to avoid;
planning a new path based on a determination result that the obstacle of the negotiation type does not execute the at least one operation of leaving the path or returning the response of agreeing to avoid.

17. The navigation method of claim 14, wherein
a navigation map is an indoor raster map used by a mobile robot during navigation.

18. A navigation device, comprising a memory, a processor, and computer programs stored in the memory and executable on the processor, wherein, when executing the computer programs, the processor implements the navigation method according to claim 14.

19. A non-transitory computer readable storage medium, wherein computer executable instructions are stored in the non-transitory computer readable storage medium, the computer executable instructions are configured to execute the navigation method of claim 14.

\* \* \* \* \*